US009201862B2

(12) United States Patent
Pérez Cortés et al.

(10) Patent No.: US 9,201,862 B2
(45) Date of Patent: Dec. 1, 2015

(54) METHOD FOR SYMBOLIC CORRECTION IN HUMAN-MACHINE INTERFACES

(75) Inventors: Juan Carlos Pérez Cortés, Valencia (ES); Rafael Llobet Azpitarte, Valencia (ES); José Ramón Navarro Cerdán, Valencia (ES); Joaquim Francesc Arlandis Navaro, Valencia (ES)

(73) Assignee: ASOCIACION INSTITUTO TECNOLOGICO DE INFORMATICA, Valencia (ES)

( * ) Notice: Subject to any disclaimer, the term of this patent is extended or adjusted under 35 U.S.C. 154(b) by 626 days.

(21) Appl. No.: 13/517,884

(22) Filed: Jun. 14, 2012

(65) Prior Publication Data

US 2012/0323560 A1    Dec. 20, 2012

Related U.S. Application Data

(60) Provisional application No. 61/497,521, filed on Jun. 16, 2011.

(51) Int. Cl.
 *G06F 17/27* (2006.01)
(52) U.S. Cl.
 CPC .................. *G06F 17/2775* (2013.01)
(58) Field of Classification Search
 CPC ....... G06F 17/24; G06F 17/273; G06F 17/27; G06F 17/20; G06F 17/2705; G06F 17/271; G06F 17/2715; G06F 17/272; G06F 17/2725; G06F 17/2735; G06F 17/274; G06F 17/2745; G06F 17/275; G06F 17/2755; G06F 17/276; G06F 17/2765; G06F 17/277; G06F 17/2775
 USPC .................................................... 704/9, 2, 257
 See application file for complete search history.

(56) References Cited

U.S. PATENT DOCUMENTS 5,510,981 A * 4/1996 Berger et al. ..................... 704/2
5,712,957 A * 1/1998 Waibel ................. G06K 9/6293
                                                            704/240

(Continued)

OTHER PUBLICATIONS

Hassan, Ahmed, Sara Noeman, and Hany Hassan. "Language Independent Text Correction using Finite State Automata." IJCNLP. 2008.*

(Continued)

*Primary Examiner* — Lamont Spooner
(74) *Attorney, Agent, or Firm* — Aboy & Associates, PC; Mateo Aboy

(57) ABSTRACT

Disclosed embodiments include methods and systems for symbolic correction in human-machine interfaces that comprise (a) implementing a language model; (b) implementing a hypothesis model; (c) implementing an error model; and (d) processing a symbolic input message based on weighted finite-state transducers to encode 1) a set of input hypothesis using the hypothesis model, 2) the language model, and 3) the error model to perform correction on the sequential pre-segmented symbolic input message in the human-machine interface. According to a particular embodiment, the processing step comprises a combination of the language model, the hypothesis model, and the error model performed without parsing by employing a composition operation between the transducers and a lowest cost path search, exact or approximate, on the composed transducer.

18 Claims, 7 Drawing Sheets

(56) References Cited

U.S. PATENT DOCUMENTS

| | | | | | |
|---|---|---|---|---|---|
| 5,855,000 | A | * | 12/1998 | Waibel | G06K 9/03 382/186 |
| 6,154,722 | A | * | 11/2000 | Bellegarda | G10L 15/197 704/255 |
| 7,565,282 | B2 | * | 7/2009 | Carus et al. | 704/9 |
| 7,716,039 | B1 | * | 5/2010 | Bangalore | G06F 17/289 704/1 |
| 8,296,123 | B2 | * | 10/2012 | Thayer | G06F 17/2818 704/2 |
| 8,433,556 | B2 | * | 4/2013 | Fraser et al. | 704/4 |
| 2003/0225579 | A1 | * | 12/2003 | Wang | G10L 15/1815 704/251 |
| 2006/0095248 | A1 | * | 5/2006 | Menezes et al. | 704/3 |
| 2006/0149558 | A1 | * | 7/2006 | Kahn | G10L 15/063 704/278 |
| 2006/0195321 | A1 | * | 8/2006 | Deligne | G10L 15/18 704/257 |
| 2007/0192104 | A1 | * | 8/2007 | Blewett | G10L 15/28 704/256 |
| 2007/0265826 | A1 | * | 11/2007 | Chen | G06F 17/2818 704/2 |
| 2011/0173000 | A1 | * | 7/2011 | Yamamoto | G10L 15/1815 704/240 |
| 2014/0205974 | A1 | * | 7/2014 | Pellom | G09B 19/06 434/157 |
| 2014/0288915 | A1 | * | 9/2014 | Madnani et al. | 704/2 |

OTHER PUBLICATIONS

Richard Beaufort et al, "A Weighted Finite-State Framework for Correcting Errors in Natural Scene OCR", Ninth International Conference on Document Analysis and Recognition, Sep. 23-26, 2007. ICDAR 2007, vol. 2 pp. 889-893.

Thomas M. Breuel, "The OCRopus Open Source OCR System", Proc. SPIE 6815, Document Recognition and Retrieval XV, 68150F (Jan. 28, 2008); doi:10.1117/12.783598.

Björn Hoffmeister et al, "WFST Enabled Solutions to ASR Problems: Beyond HMM Decoding", IEEE Transactions on Audio, Speech, and Language Processing, vol. 20, No. 2, Feb. 2012.

Takaaki Hori et al, "Efficient WFST-Based One-Pass Decoding With On-The-Fly Hypothesis Rescoring in Extremely Large Vocabulary Continuous Speech Recognition", IEEE Transactions on Audio, Speech, and Language Processing, vol. 15, No. 4, May 2007.

X. Liu et al, "Language Model Combination and Adaptation Using Weighted Finite State Transducers", IEEE International Conference on Acoustics Speech and Signal Processing (ICASSP), Mar. 14-19, 2010, pp. 5390-5393.

Rafael Llobet et al, "OCR Post-processing Using Weighted Finite-State Transducers", 20th International Conference on Pattern Recognition (ICPR), Aug. 23-26, 2010, pp. 2021-2024.

Rafael Llobet et al, "Efficient OCR Post-Processing Combining Language, Hypothesis and Error Models",E.R. Hancock et al. (Eds.): SSPR & SPR 2010, LNCS 6218, pp. 728-737, 2010. Springer-Verlag Berlin Heidelberg 2010.

Mehryar Mohri et al, "Weighted Finite-State Transducers in Speech Recognition", Elsevier—Computer Speech & Language, vol. 16, Issue 1, Jan. 2002, pp. 69-88.

Mehryar Mohri et al, "The design principles of a weighted finite-state transducer library", Elsevier—Theoretical Computer Science 231 (2000) 17-32.

Darren Moore et al,"Juicer: A Weighted Finite-State Transducer Speech Decoder", S. Renals, S. Bengio, and J. Fiscus (Eds.): MLMI 2006, LNCS 4299, pp. 285-296, 2006. Springer-Verlag Berlin Heidelberg 2006.

Juan Carlos Perez-Cortes et al, "Improvement of Embedded Human-Machine Interfaces Combining Language, Hypothesis and Error Models", 22nd International Workshop on Database and Expert Systems Applications (DEXA), Aug. 29, 2011-Sep. 2, 2011, pp. 359-363.

Juan Carlos Perez-Cortes et al, "Using Field Interdependence to Improve Correction Performance in a Transducer-based OCR Post-processing System", 2010 International Conference on Frontiers in Handwriting Recognition (ICFHR), Nov. 16-18, 2010, pp. 605-610.

Juan Carlos Perez-Cortes et al, "Stochastic Error-Correcting Parsing for OCR Post-processing.", 15th International Conference on Pattern Recognition, 2000. vol. 4, pp. 405-408 vol. 4.

Christian Raymond et al, "On the use of finite state transducers for semantic interpretation", Elsevier—Speech Communication, vol. 48, Issues 3-4, Mar.-Apr. 2006, pp. 288-304, doi:10.1016/j.specom. 2005.06.012.

* cited by examiner

METHOD FOR SYMBOLIC CORRECTION IN HUMAN-MACHINE INTERFACES

CROSS-REFERENCE TO RELATED APPLICATIONS

This application claims the benefit of U.S. Provisional Application No. 61/497,521 filed on 2011 Jun. 16 by the present inventors, which is incorporated herein by reference.

TECHNICAL FIELD

Disclosed embodiments relate to methods and systems for symbolic correction. Specifically, they relate to methods and systems for correction in symbolic human-machine interfaces.

BACKGROUND

Human-machine interfaces are subject to variable amounts of error and uncertainty. The application of a post-processing or correction algorithm is therefore critical. The excellent performance shown by humans when we interpret a spoken, gestured, typed, handwritten or otherwise transmitted message is mostly due to our error-recovery ability, due to the lexical, syntactic, semantic, pragmatic, and discursive language constraints humans apply.

Among the different levels at which language can be modeled, the lowest one is the word level, involving lexical constraints on the sequence of characters inside each word. The next one is the sentence level, which takes into account syntactic and semantic constraints on the sequence of words or word categories inside a sentence (or a field, for instance, in a form-processing application). Word and sentence level models typically apply dictionary search methods, n-grams, Edit Distance-based techniques, Hidden Markov Models, and other character or word category transition models. The higher levels consider a wider context and require specific a priori knowledge of the application domain.

The goal of a symbol-input post-processing method is to optimize the likelihood that the strings received as input hypotheses are correct, in the sense that they are compatible with the constraints imposed by the task (language). These constraints conform the language model and can be as simple as a small set of valid words (e.g. the possible values of the "country" field in a form) or as complex as an unconstrained sentence in a natural language.

In practice, the simplest method to handle correction is to use a lexicon to validate the known words and ask an operator to verify or input by hand the unknown words. Specific techniques can be used to carry out approximate search in the lexicon.

Other methods are based on n-grams or on finite-state machines, where a candidate string is parsed and the set of transitions with the lowest cost (highest probability) defines the output string. The classical algorithm, widely used in different fields, to find the maximum likelihood path on a finite-state machine and to perform error-correcting parsing on a regular grammar is the Viterbi Algorithm.

SUMMARY

Disclosed embodiments include a method for symbolic correction in human-machine interfaces that comprises: (a) implementing a language model; (b) implementing a hypothesis model; (c) implementing an error model; and (d) processing a symbolic input message based on weighted finite-state transducers to encode 1) a set of input hypothesis using the hypothesis model, 2) the language model, and 3) the error model to perform correction on the sequential pre-segmented symbolic input message in the human-machine interface. According to a particular embodiment, the processing step comprises a combination of the language model, the hypothesis model, and the error model performed without parsing by employing a composition operation between the transducers and a lowest cost path search, exact or approximate, on the composed transducer.

BRIEF DESCRIPTION OF THE DRAWINGS

Disclosed embodiments are illustrated by way of example, and not by way of limitation, in the figures of the accompanying drawings.

DETAILED DESCRIPTION

A. Overall Method & System Description

Figure 1:
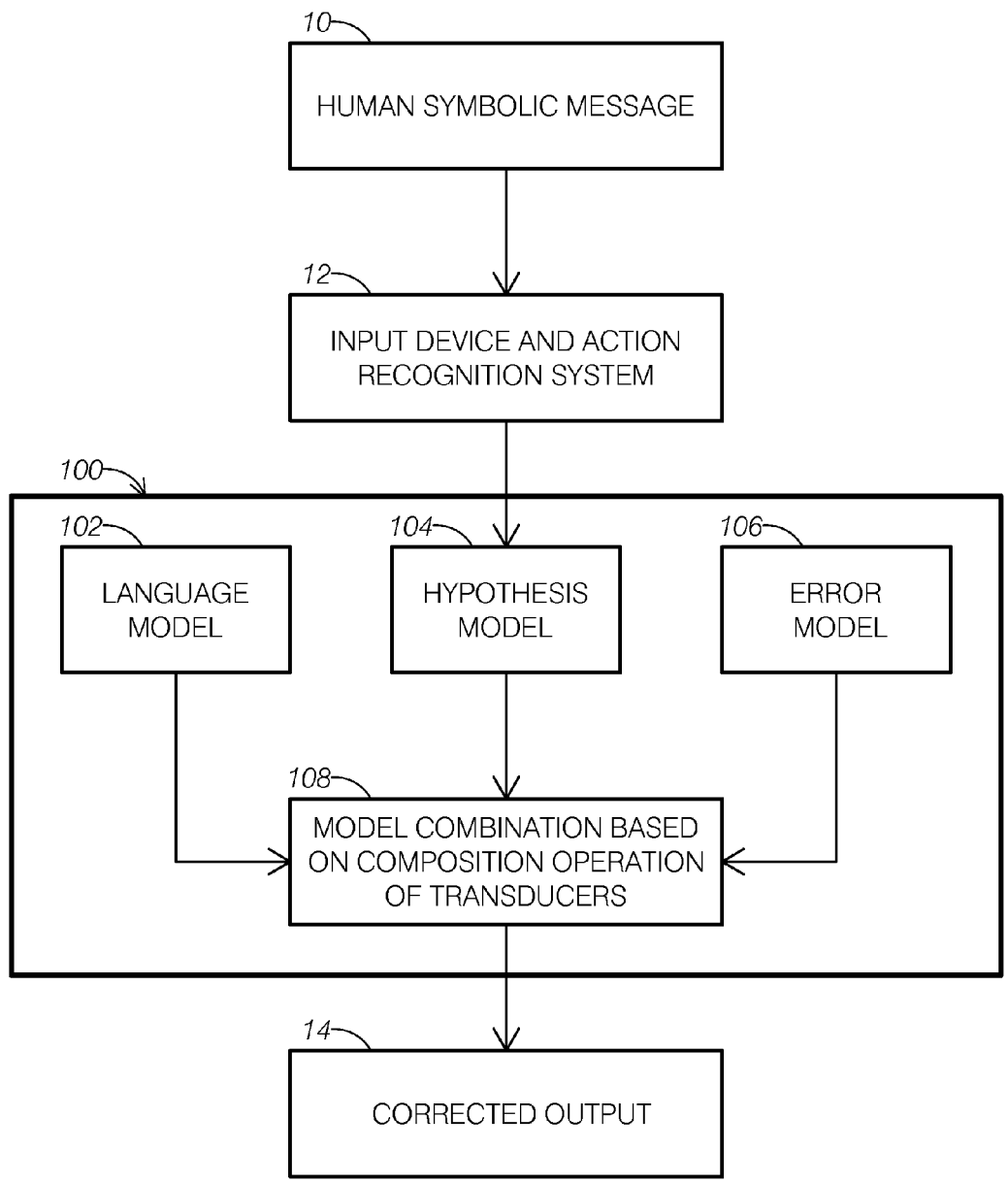
FIG. 1 shows a block diagram of the method or system according to one embodiment.

According to one embodiment, as shown in FIG. 1 the method for symbolic correction in human-machine interfaces 100 comprises: (a) implementing a language model 102; (b) implementing a hypothesis model 104; (c) implementing an error model 106; and (d) processing a sequential pre-segmented symbolic input message 10 based on weighted finite-state transducers to encode 1) a set of input hypothesis using the hypothesis model 104, 2) the language model 102, and 3) the error model 106 to perform correction on the sequential pre-segmented symbolic input message in the human-machine interface. According to a particular embodiment, the processing step comprises a combination of the language model, the hypothesis model, and the error model performed without parsing by employing a composition operation 108 between the transducers and a lowest cost path search, exact or approximate, on the composed transducer in order to generate the corrected or post-processed output 14.

The method for symbolic correction 100 can be implemented as part of any system that takes a human symbolic message 10 (e.g., a physical action) captured by an input device and action recognition system 12 that generates an input hypothesis for the hypothesis model 104. The particular application domain determines the particular human tasks and the corresponding symbolic language. These in turn, these are used to define a grammar or inference for the language model 102, as well as a plurality of error operations and weights definition for the error model 106. Consequently, while the hypothesis model 104 takes as the input the output hypothesis from the input/action recognition system 12, both the language model and the error model are designed and defined for a particular application and are independent of the real-time input (i.e. human symbolic messages 10). The symbolic system comprises a processor configured to perform processing tasks required by the symbolic correction method 100, one or more memories, and an input-output hardware interface.

Certain specific details are set forth in the following description and figures to provide a thorough understanding of various embodiments disclosed. Certain well-known details often associated with computing hardware, processing, and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor and memory. Generally, program modules include routines, programs, objects, components, and data structures that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Alternatively, according to an embodiment the methods disclosed can be implemented in hardware using an integrated microcontroller or FPGA device to create corresponding apparatuses or systems. Those skilled in the art will appreciate that, given the description of the modules comprising the disclosed embodiments provided in this specification, it is a routine matter to provide working systems which will work on a variety of known and commonly available technologies capable of incorporating the features described herein.

A.1. Language Model (LM)

According to one embodiment, and without limitation, the symbolic correction method or system 100 makes use of a grammatical inference algorithm to build a stochastic finite-state machine that accepts the smallest k-Testable Language in the Strict Sense (k-TS language) consistent with a task-representative language sample as part of the language model (also known as a constraints model) 102. The set of strings accepted by such an automaton is equivalent to the language model obtained using n-grams, for n=k.

An advantage of the chosen setting resides in its flexibility. The language sample can be a simple lexicon (with each word or sentence appearing only once), a list of strings extracted from a real instance of the task (with each one appearing as many times as in the sample), a list of sentences with characters, words or word categories as the symbols of the grammar, etc. Only in the first case, when using a classical lexicon, the automaton is not required to be stochastic, since a lexicon is not a representative language sample. In the other cases, the model takes advantage of the probabilistic information present in the data.

In one embodiment, the value of k is used to define the behavior of the model. In a lexical model, if k is made equal to the length of the longest word in the sample, a post-processing method is obtained where only words that exist in the sample are valid, but if k is set to a lower value, a classical n-gram model will result, where the corrected words may not be in the reference sample.

Figure 2:
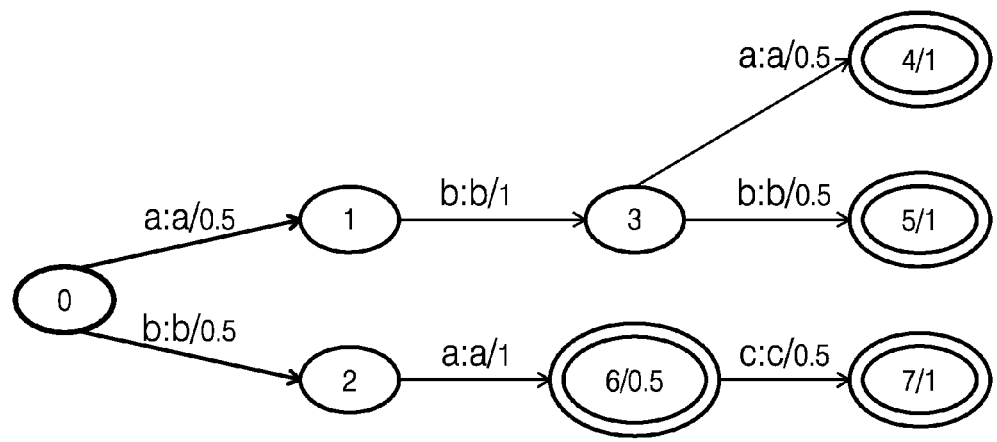
FIG. 2 shows an illustrative example of a probabilistic error transducer in the language model.

FIG. 2 shows the probabilistic identity transducer associated with the sample S={aba, abb, ba, bac} and k=3. In this description, for convenience, transducer input and output symbols are equal in each transition, i.e., the identity transducer, which can be seen as an acceptor of the language L(S).

A.2. Hypothesis Model (HM)

If the segmentation of the input is assumed known, as happens in many practical tasks like printed OCR or pre-segmented forms off-line handwriten OCR (ICR), isolated on-line character or gesture recognition, physical keyboard, reduced keyboard such as a mobile phone one, or soft touch key input, etc., the symbol-input subsystem generates, in the most general case, a sequence of n-dimensional vectors $\bar{v}_1 \ldots \bar{v}_m$, where n is the number of possible hypotheses for each symbol, m the length of the string and $v_{i,j}$ the a posteriori probability of the $j^{th}$ hypotheses of the $i^{th}$. According to one embodiment of the hypothesis model 104, the correction method and system 100 represents this sequence using a WFSA (or an identity WFST) with m+1 states and n transitions between each pair of states.

Figure 3:
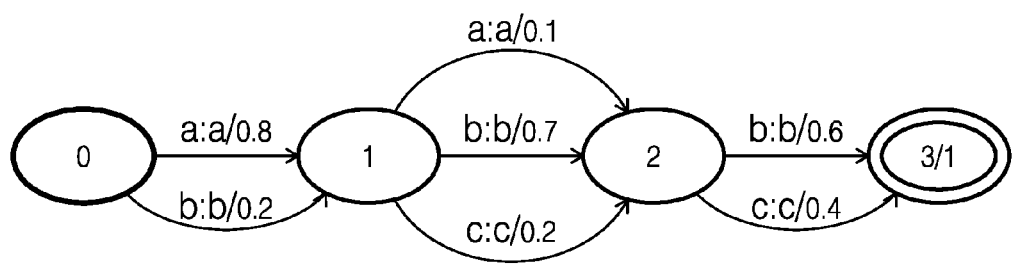
FIG. 3 shows an illustrative example of a weighted finite-state transducer in the hypothesis model.

FIG. 3 shows an example of a WFST with alphabet [a, b, c] that represents the symbol-input [0.8, 0.2, 0.0], [0.1, 0.7, 0.2], [0.0, 0.6, 0.4]. This means that the first symbol is a with probability 0.8 or b with probability 0.2, the second symbol is a, b or c with probabilities 0.1, 0.7 and 0.2 respectively, and so on. Transitions with zero-probability are not shown in the graph. Instead of working exclusively with the most probable output (abb in the example) this transducer models the uncertainty of the input subsystem.

A.3. Error Model (EM)

In some cases, none of the symbol sequences present in the input hypothesis is compatible with the language model, or it could be the case that a string similar but not included in the set of hypotheses is more probable than any of the supplied options. In a classical n-gram model, this effect is accounted for by a smoothing procedure. According to one embodiment of the symbolic correction method or system 100, the possible variations allowed and their probabilities are represented by an error model 106.

A detailed Error Model 106 allows for a finer control of the smoothing effect. Typically, the three usual edit operations will be defined: substitutions (including the substitution of a symbol by itself), insertions and deletions. Given two symbols $s_1$, $s_2$ and the empty symbol $\epsilon$, substitutions, insertions and deletions are transductions of type $s_1/s_2$, $\epsilon/s_2$ and $s_1/\epsilon$ respectively.

Each of these operations can be assigned a probability. The probability of substitutions is derived from the confusion matrix of the input process. This matrix is a table containing the confusion probability of each pair of symbols, estimated using a representative corpus. If the input is an OCR recognizer, the probabilities of the classifier confusing two characters is modeled. If the input process is a keyboard, the probabilities of the user pressing an adjacent key instead of the right one is represented. In a keyboard where several characters share the same key (like in a mobile phone), that fact is also represented in the error model 106.

Figure 4:
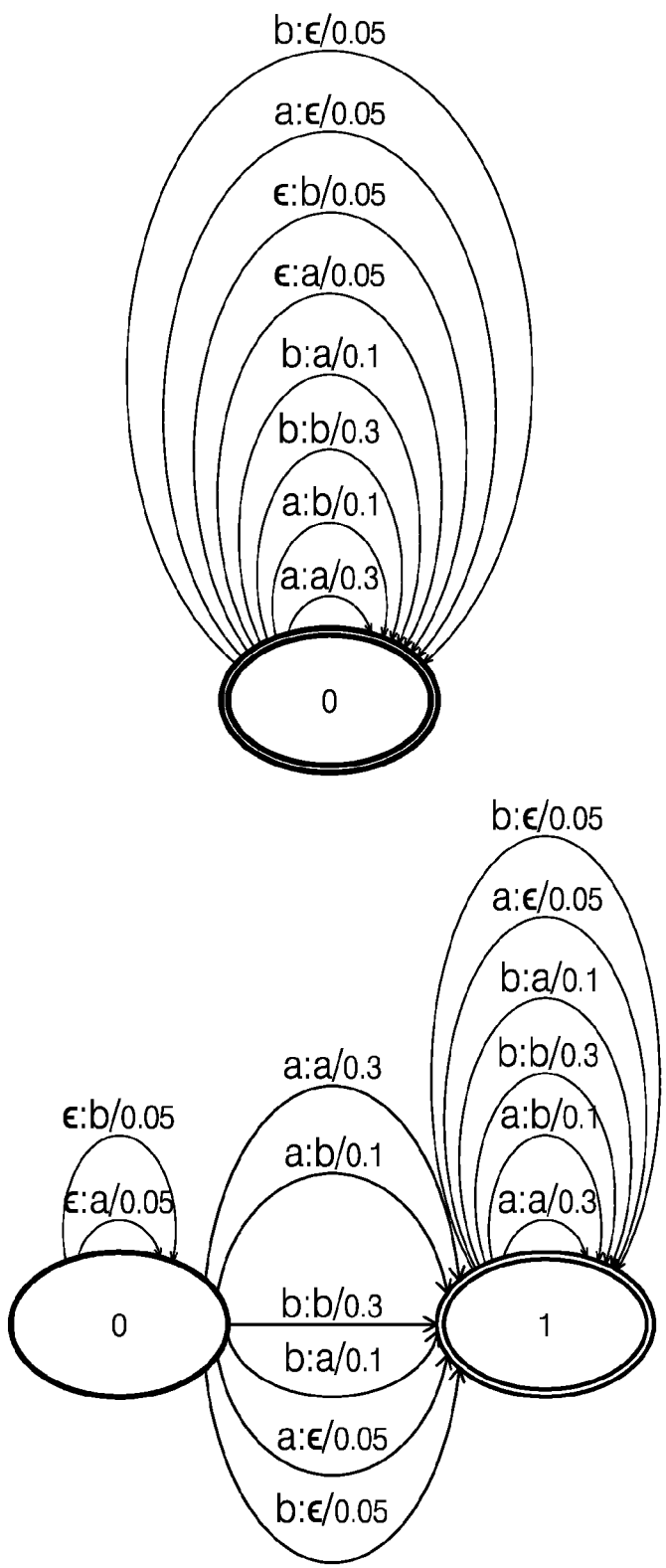
FIG. 4 shows an illustrative example of a weighted finite-state transducer in the error model.

According to one embodiment, the error model 106 is a "static" model of the uncertainty of the input subsystem, complementing the "dynamic" estimation provided by the set of input hypotheses. The likelihoods of insertions and deletions are task-dependent and can be empirically estimated. FIG. 4 shows an example of a WFST representing an Error Model with symbols in {a,b}.

According to one embodiment, the error model 106 allows insertions or deletions only at the beginning or at the end of the string, to restrict the number of error operations, to represent other sources of error like transposition of two adjacent symbols, which is useful in keyboard typewriting tasks, different confusion matrices, including e.g. the distances among the keys, etc.

A.4. Combination of LM, HM, and EM

According to one embodiment, the correction method and system 100 does not perform explicit parsing. Instead, the combination or fusion of the different models is performed through the composition operation 108 between transducers as follows. Let $L_1$ be the set of strings that a given HM can produce, and $L_2$ the set of strings accepted by a given LM. The goal is to find the most likely transduction of a string in $L_1$ into a string in $L_2$ by means of the intermediate transduction defined in an EM. This process is equivalent to finding the most probable path in the transducer HM⊙EM⊙LM. The transducer $T_1$=HM⊙EM transduces any string from $L_1$ by applying the operations of the Error Model EM.

Figure 5:
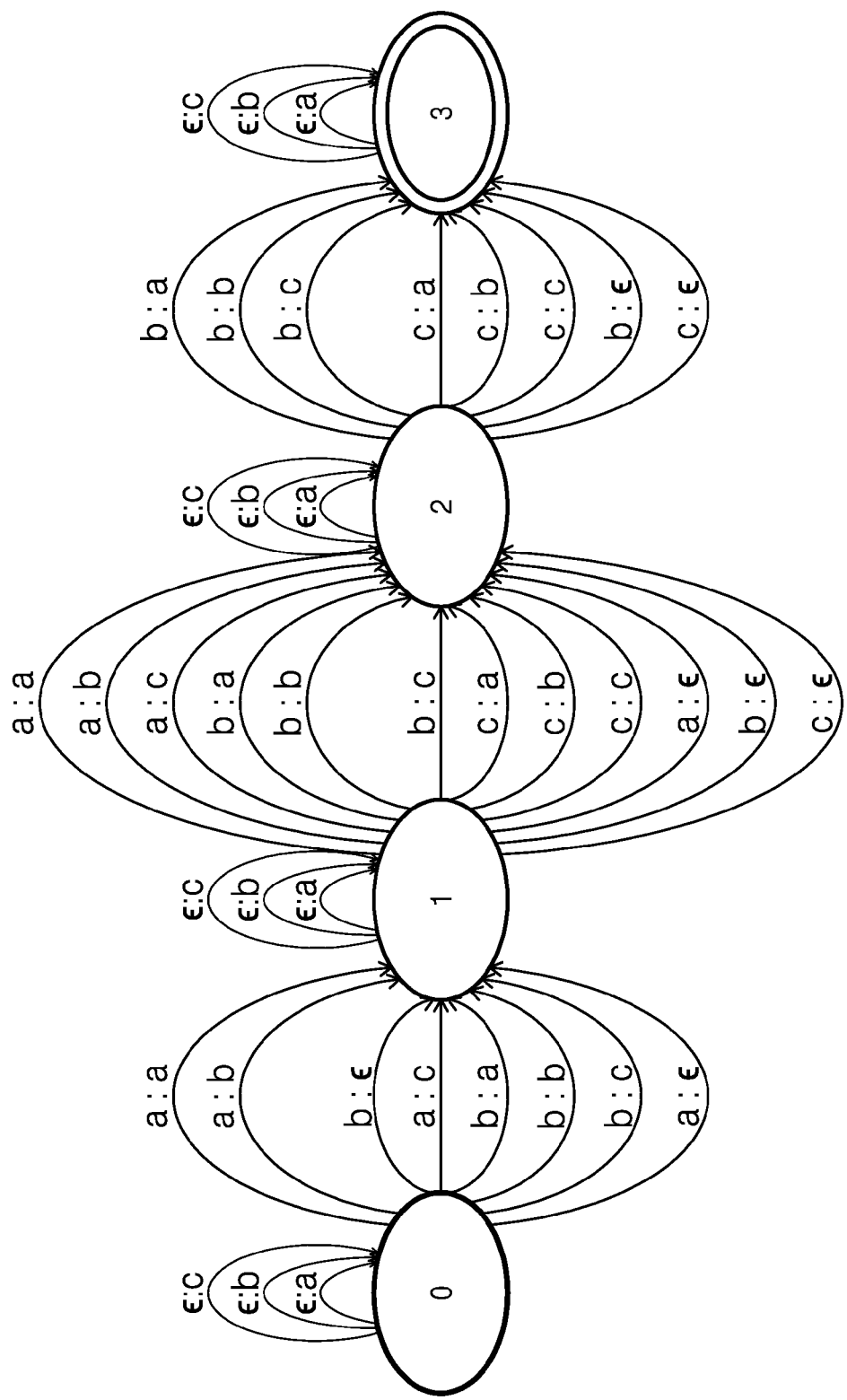
FIG. 5 shows an illustrative example of the composition of the transducers.

FIG. 5 provides an illustrative example showing the composition of the transducers HM and EM previously presented. This automaton transduces the strings accepted by HM to any string in $\Sigma^*$. Consequently, the transducer $T_2=T_1\odot LM$ accepts only strings belonging to $L_2$, and the result of the transduction with the most probable path is the final corrected string. If several alternatives are needed, the n-best paths can also easily be obtained.

A.5. Cost Definition and Parameter Optimization

The computation of the best path is required as part of the process. A path is a sequence of transitions in the composed transducer and each transition t has an associated probability, which is computed as the product of the probabilities of the corresponding transitions in HM, LM and EM. According to one embodiment, the probability of transition is defined as follows (assuming independence and an equal influence from all models), $$P(t)=P(LM,EM,HM|t)=P(LM|t)P(EM|t)P(HM|t)$$

In this embodiment, the probability of the output string is computed as the product of the probabilities of the transitions along the most probable path in the composed transducer. Given $x \in L_1$ and $y \in L_2$, the probability of the transduction x, y is $P(x,y)=\Pi_{i=1}^{n} P(t_i)$, where $t_1 \ldots t_n$ is the sequence of transitions that transduces x into y.

To avoid underflow problems, instead of working with probabilities an embodiment uses tropical semiring WFSTs ($\mathbb{K}, \oplus, \otimes, \overline{0}, \overline{1}$) where $\mathbb{K}$ are negative log probabilities, $\oplus$ is the min operation, $\otimes$ is +, $\overline{0}$ is +∞ and $\overline{1}$ is 0. Therefore, the most probable path is found using a lowest cost path search.

Since the optimum influence of each model is generally not known, two parameters $\lambda_e$ and $\lambda_h$ are defined to obtain a log-linear parametric combination of the models with different weights:

$$P(t)=P(LM|t)P(EM|t)^{\lambda_e}P(HM|t)^{\lambda_h}$$

According to a particular embodiment, and without limitation, a fixed weight 1 for the LM is used. Therefore its influence is controlled by the absolute values of the other parameters. The values of $\lambda_e$ and $\lambda_h$, along with the cost of insertions and deletions are empirically estimated using a supervised training set.

In a typical form-processing task in the data entry industry, it is important to obtain a consistent confidence value (the probability associated to the shortest path in the combined transducer) allowing the user to define a threshold and a reliable reject strategy. Consequently, according to one embodiment, the aforementioned parameters are optimized using a criterion function that maximizes the recognition rate, defined as the percentage (with respect to the total test set) of strings that were accepted and successfully corrected, for a given error rate (percentage, also in the total test set, of the strings that were accepted and generated wrong corrections. With this strategy, only rejected strings have to be reviewed by human operators, meaning that—for a commercially acceptable error rate—the economic savings yielded by the system are roughly equivalent to the number of accepted strings.

A.6. Pruning

WFST composition of very large transducers can incur in large computational costs. For a LM of 64000 states and 140000 transitions (like the one used in our experiments), a standard EM with all possible insertions, deletions and substitutions and an average-sized HM with 8 states and 5 transitions (hypotheses) per state, the resulting composed transducer can have up to 450000 states and more than two million transitions.

To avoid this problem, lazy composition together with a pruning scheme have been used in a particular embodiment. Lazy operations delay the computation of the result until it is required by another operation. This is useful when a large intermediate transducer must be constructed but only a small part of it needs to be visited. In this embodiment, the composition is delayed until the search of the shortest path (the lowest cost path) in the resulting transducer is performed. In principle, it is necessary to completely compose the transducers to compute the shortest path, but we have used a simple pruning search optimization to provide an approximate solution that allows not to explore (and therefore compose) the whole transducer.

To deal with the shortest path search, a best-first algorithm which explores the automaton by expanding the lowest cost path at each state is used in a particular embodiment. A vector with the minimum cost found at each stage (path length) is maintained. During the search, a pruning is performed based on a parameter $\delta$. If the cost of a partial solution of length n exceeds $\delta$ times the cost of the best path of length n found so far (v[n]), then the path of the partial solution is pruned. This heuristic leads to an approximate search, since the lowest cost path could be pruned. This can happen when $\delta$ is too low or when the best path contains high-cost transitions in its first stages. To avoid pruning a partial solution that could lead to the best path too early, a parameter $\rho$ is used, so that the pruning scheme is not applied to partial solutions shorter than $\rho$ states.

While particular embodiments have been described, it is understood that, after learning the teachings contained in this disclosure, modifications and generalizations will be apparent to those skilled in the art without departing from the spirit of the disclosed embodiments. It is noted that the foregoing examples have been provided merely for the purpose of explanation and are in no way to be construed as limiting. While the method, apparatus, and system has been described with reference to various embodiments, it is understood that the words which have been used herein are words of description and illustration, rather than words of limitations. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

B. Experiments and Testing

This section details the experimental methodology and the corresponding assessment results of a particular embodiment of the symbolic correction method or system 100 to illustrate its performance and utility.

The following experiments compare the system working with and without multiple hypotheses and a posteriori probabilities in HM, on an OCR task. A sample of 14000 handwritten surnames from forms scanned in a real industrial task, with a reference language model of 4.5 million Spanish surnames (99157 of which were unique) was used. A k equal to the largest surname was used in the LM, so only known surnames were accepted as corrected output. The OpenFST library was used for the experiments.

The corpus was divided into a training (15%) and a test (85%) set. The training set was used to estimate the parameters of the Error Model (insertion and deletion probabilities) and of the WFSTs composition ($\lambda_h$ and $\lambda_e$). Since the influence of each individual model can vary depending on the selected approach—using multiple hypotheses and a posteriori probabilities (WFST-PP) or using only the most probable input (WFST)—independent optimizations were performed for each approach.

Table 1 shows the best parameters found for WFST and WFST-PP. It can be noted that the optimal working point in the WFST approach is achieved when all the models have similar weights (note that LM has a fixed weight of 1), whereas the WFST-PP approach achieves better performance when the HM has a higher weight than the other two models. Also the insertion and deletion probabilities are lower in the WFST-PP approach, since more strings can be corrected with a lower cost by choosing one of the symbols proposed by the HM rather than by deletion and insertion operations.

TABLE 1

Optimal parameters found with and without a posteriori probabilities.

| | $\lambda_e$ | $\lambda_h$ | $p_i$ | $p_d$ |
|---|---|---|---|---|
| WFST-PP | 1.17 | 2.38 | 0.005 | 0.004 |
| WFST | 1.05 | 1.04 | 0.007 | 0.008 |

Figure 6:
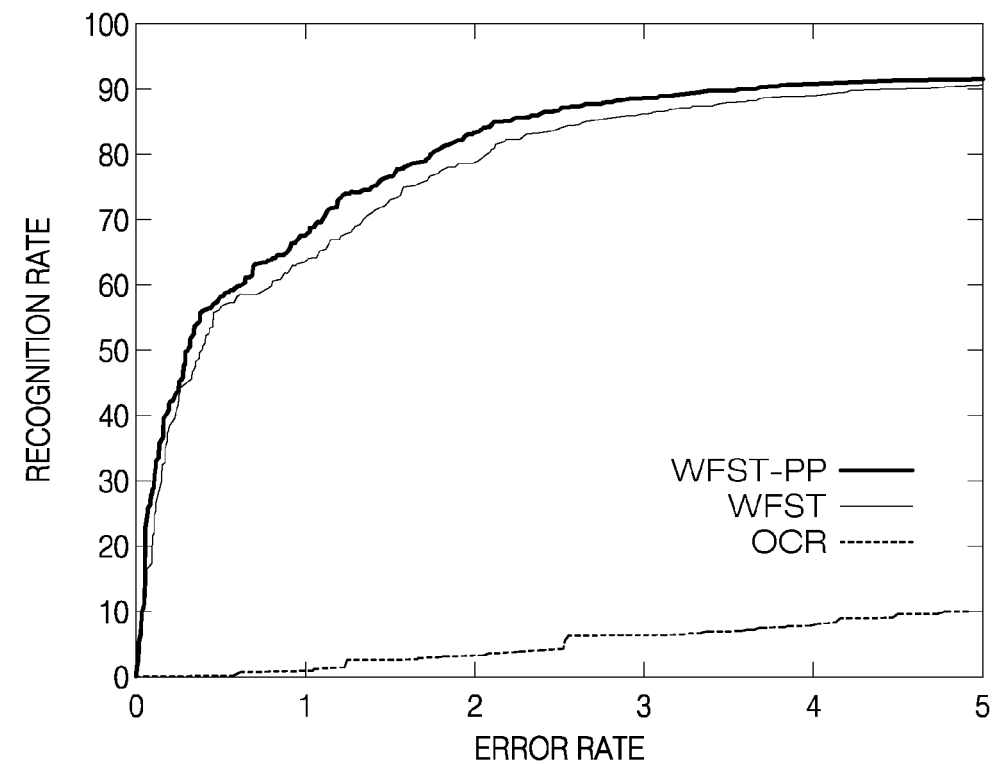
FIG. 6 shows the recognition and error rates of the proposed method according to one embodiment.
Figure 6:
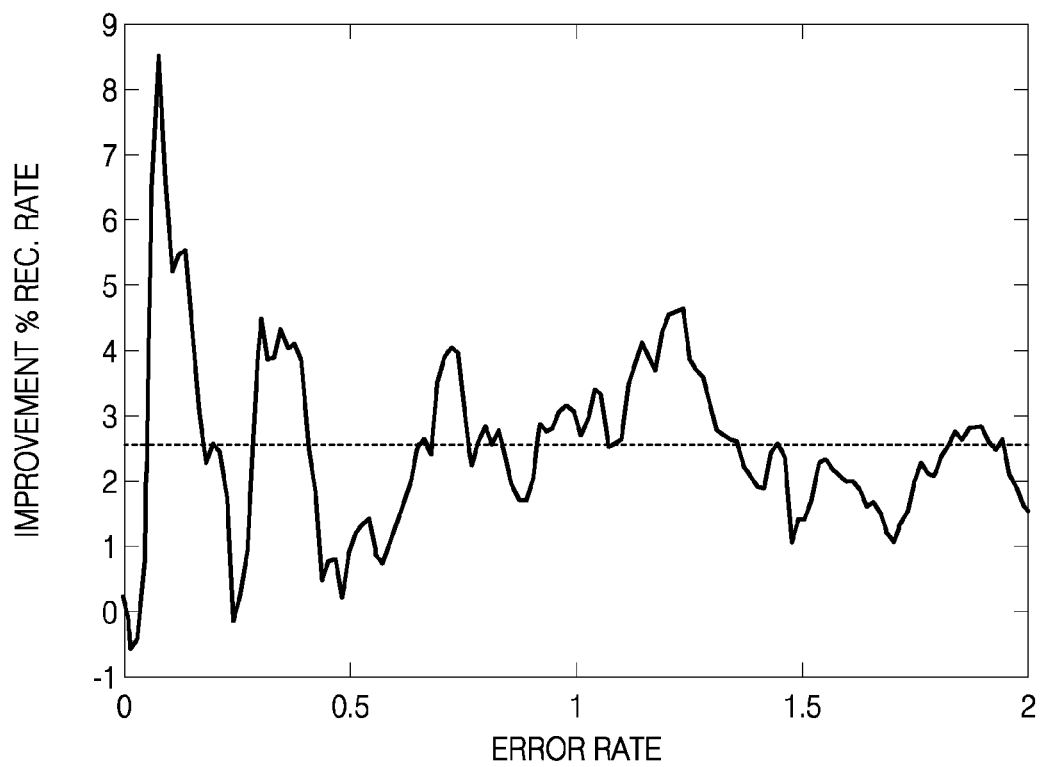
Figure 7:
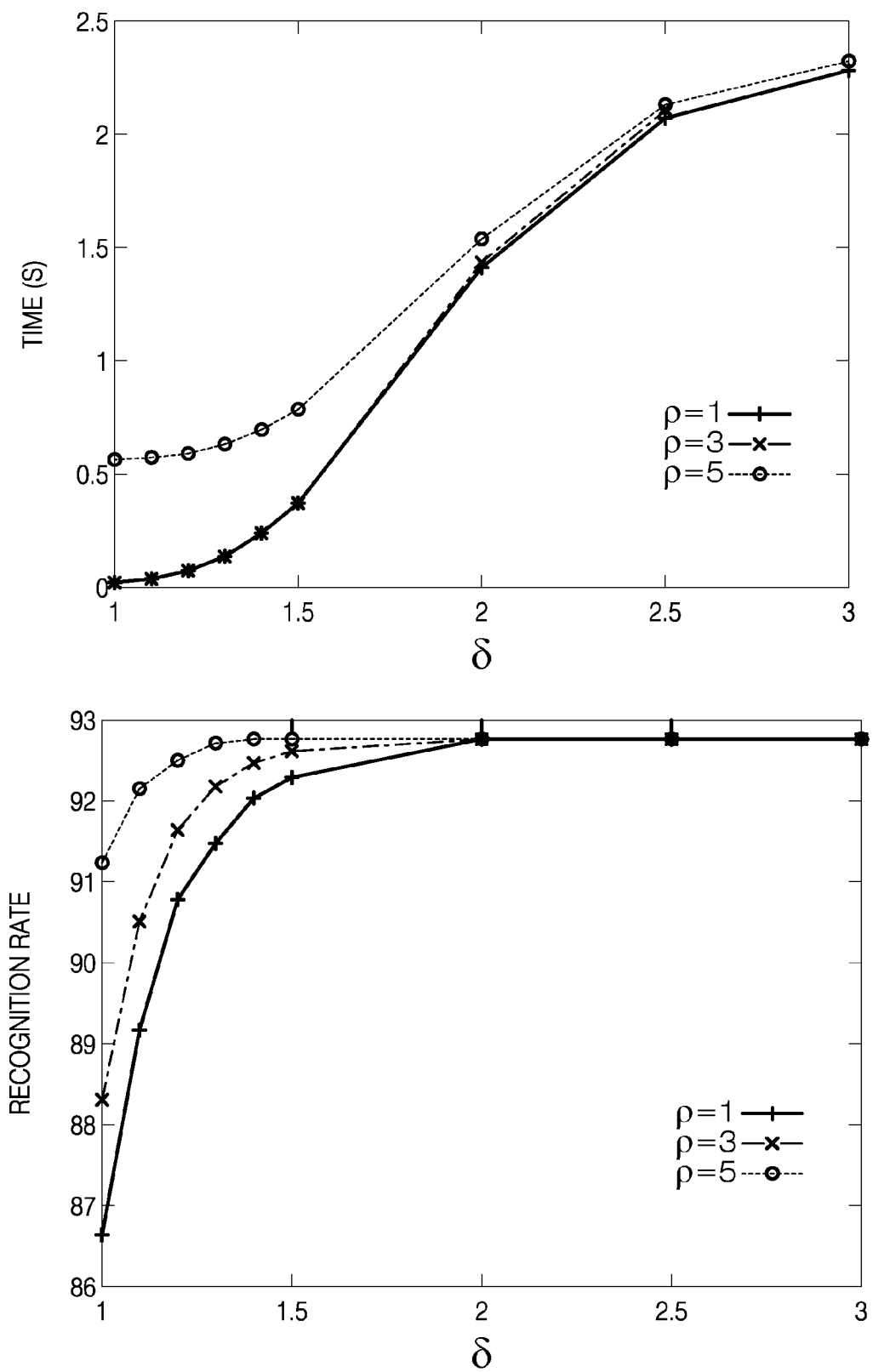
FIG. 7 shows the average correction time (ms.) obtained in the assessment study.
Figure 8:
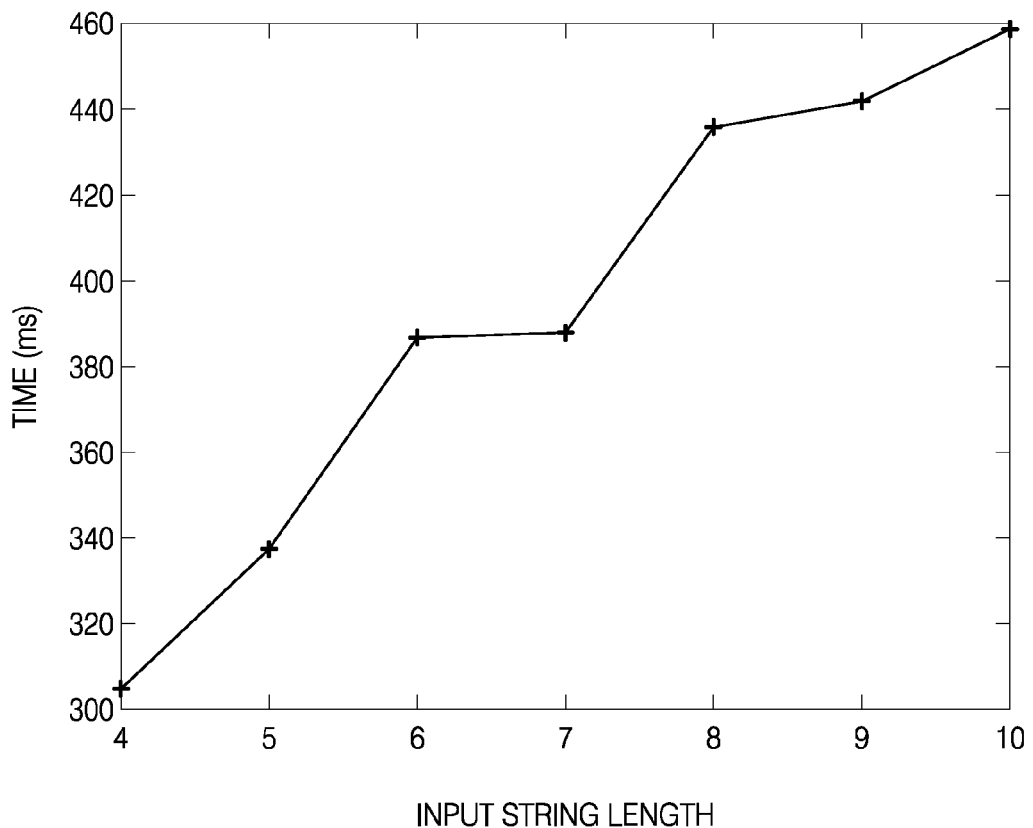
FIG. 8 shows the average computational cost obtained in the assessment study.

FIG. 6 shows the recognition and error rates of the proposed method according to one embodiment using a) multiple hypotheses and a posteriori probabilities in HM (WFST-PP), b) the same approach using only the input strings (WFST), and c) the original, uncorrected input. The computational cost is another important issue in this task, where the size of the models can be very large in practice, and the typical operations involve large batchs of documents to recognize. A set of experiments were carried out to test the influence of the pruning method. FIG. 7 shows the average correction time (ms.) obtained in an Intel Xeon 2.5 GHz with 2 GB of memory, Linux OS and gcc 4.4, and the accuracy (percentage of well corrected words) achieved for different values of δ and ρ. These results were obtained for a language model built from 99157 unique words. For larger language models, the computational cost grows sub-linearly. FIG. 8 plots the average computational cost for δ=1.5 and ρ=3, against the length of the input hypothesis.

The invention claimed is:

1. A method for symbolic correction in human-machine interfaces said method comprising:
   (a) implementing a language model;
   (b) implementing a hypothesis model;
   (c) implementing an error model; and
   (d) processing a symbolic input message using a hardware processor, said processing based on weighted finite-state transducers to encode 1) a set of input hypothesis using said hypothesis model, 2) said language model, and 3) said error model in order to perform correction on said symbolic input message in the human-machine interface employing a probability of transition of the form P(t)=P(LM, EM, HM|t)=P(LM|t)P(EM|t)P(HM|t) with tropical semiring WFSTs ($\mathbb{K}$, $\oplus$, $\otimes$, $\overline{0}$, $\overline{1}$).

2. The method of claim 1, wherein said processing comprises a combination of said language model, said hypothesis model, and said error model performed without parsing by employing a composition operation between said transducers to generate a composed transducer, as well as a lowest cost path search on said composed transducer.

3. The method of claim 2, wherein said language model uses a grammatical inference algorithm.

4. The method of claim 3, wherein said grammatical inference algorithm is designed to accept a smallest k-Testable Language in the Strict Sense (k-TS language).

5. The method of claim 4, wherein said hypothesis model is based on a weighted finite-state transducer that dynamically models the uncertainty of a symbol-input subsystem.

6. The method of claim 5, wherein said error model complements said hypothesis model incorporating a static model of the uncertainty of said symbol-input subsystem.

7. The method of claim 6, wherein said error model complements said hypothesis model by incorporating a static model of the uncertainty of said symbol-input subsystem including a plurality of edit operations.

8. The method of claim 7, wherein said plurality of edit operations include substitutions, insertions, and deletions.

9. A symbolic correction apparatus for human-machine interfaces comprising:
   (a) a memory to store a language model, a hypothesis model, and an error model, and (b) a processor configured for processing a symbolic input message, said processing based on weighted finite-state transducers to encode 1) a set of input hypothesis using said hypothesis model, 2) said language model, and 3) said error model in order to perform correction on said symbolic input message in the human-machine interface employing a probability of transition of the form P(t)=P(LM, EM, HM|t)=P(LM|t)P(EM|t)P(HM|t) with tropical semiring WFSTs ($\mathbb{K}$, $\oplus$, $\otimes$, $\overline{0},\overline{1}$).

10. The symbolic correction apparatus of claim 9, wherein said processing comprises a combination of said language model, said hypothesis model, and said error model performed without parsing by employing a composition operation between said transducers to generate a composed transducer, as well as a lowest cost path search on said composed transducer.

11. The symbolic correction apparatus of claim 9, wherein said language model uses a grammatical inference algorithm.

12. The symbolic correction apparatus of claim 11, wherein said grammatical inference algorithm is designed to accept a smallest k-Testable Language in the Strict Sense (k-TS language).

13. The symbolic correction apparatus of claim 9, wherein said hypothesis model is based on a weighted finite-state transducer that dynamically models the uncertainty of a symbol-input subsystem.

14. The symbolic correction apparatus of claim 13, wherein said error model complements said hypothesis model by incorporating a static model of the uncertainty of said symbol-input subsystem including a plurality of edit operations.

15. The symbolic correction apparatus of claim 14, wherein said plurality of edit operations include substitutions, insertions, and deletions.

16. The symbolic correction apparatus of claim 9, wherein said error model complements said hypothesis model incorporating a static model of the uncertainty of said symbol-input subsystem.

17. A non-transitory computer-readable storage medium with an executable program stored thereon to implement symbolic correction in human-machine interfaces, wherein said executable program instructs an apparatus to perform the following steps:
   (a) implementing a language model;
   (b) implementing a hypothesis model;
   (c) implementing an error model; and
   (d) processing a symbolic input message, said processing based on weighted finite-state transducers to encode 1) a set of input hypothesis using said hypothesis model, 2) said language model, and 3) said error model in order to perform correction on said symbolic input message in the human-machine interface employing a probability of transition of the form P(t)=P(LM, EM, HM|t)=P(LM|t)P(EM|t)P(HM|t) with tropical semiring WFSTs ($\mathbb{K}, \oplus, \otimes, \overline{0}, \overline{1}$).

18. The non-transitory computer-readable storage medium of claim 17, wherein (a) said processing comprises a combination of said language model, said hypothesis model, and said error model performed without parsing by employing a composition operation between said transducers to generate a composed transducer, as well as a lowest cost path search on said composed transducer; (b) said language model uses a grammatical inference algorithm; (c) said grammatical inference algorithm is designed to accept a smallest k-Testable Language in the Strict Sense (k-TS language); (d) said hypothesis model is based on a weighted finite-state transducer that dynamically models the uncertainty of a symbol-input subsystem; (e) said error model complements said hypothesis model incorporating a static model of the uncertainty of said symbol-input subsystem; (f) said error model complements said hypothesis model by incorporating a static model of the uncertainty of said symbol-input subsystem including a plurality of edit operations; (g) said plurality of edit operations include substitutions, insertions, and deletions; and (h) said method for symbolic correction in human-machine interfaces includes a probability of transition of the form P(t)=P(LM, EM, HM|t)=P(LM|t)P(EM|t)P(HM|t) and employs tropical semiring WFSTs ($\mathbb{K}, \oplus, \otimes, \overline{0}, \overline{1}$).

* * * * *